Feb. 2, 1965 W. HOLZER 3,168,630

ROTARY DISCS AND STEP BY STEP DRIVE THEREFOR

Filed Nov. 21, 1962

INVENTOR:
WALTER HOLZER
By Toulmin & Toulmin
Attorneys

United States Patent Office 3,168,630

Patented Feb. 2, 1965

3,168,630

ROTARY DISCS AND STEP BY STEP DRIVE THEREFOR

Walter Holzer, Drosteweg 19, Meersburg (Bodensee), Germany

Filed Nov. 21, 1962, Ser. No. 239,194
Claims priority, application Germany, Nov. 28, 1961, H 44,237
5 Claims. (Cl. 200—105)

The invention relates to a device comprising a rotary disc and a drive mechanism therefor, and has particular reference to control discs which operate electric switches, for example, by contacts scanning cam tracks on the discs.

The invention aims to provide a disc that can be made in the form of a pressing and with which, in spite of its cheapness and the fact that it is designed to be moved by an oscillating pawl or like lever, there need be no lost motion during the interval between the individual switching steps executed by the control disc.

Control discs are known which are moved by peripheral toothing and pinions. The disadvantage of such constructions is that, unless teeth are used which are expensive and unfavourable to manufacture, there is always a certain amount of play between each switching step and between the individual phases of movement. Considerable manufacturing expenditure is necessary if such play is to be avoided.

According to the invention, there is provided a device comprising a rotary disc, such as a control disc for operating the programme of a fully automatic washing machine by means of cam tracks which are scanned by electric contacts, and a drive mechanism therefor, wherein the disc is provided with a series of spaced projections and the drive mechanism includes an actuating lever for turning the disc in one direction by engaging behind one of the projections, a latch being provided to lock the disc against rotation in the other direction.

With this construction the disc is preferably advanced with the aid of projections on one face thereof and by an angled oscillatory actuating lever engaging therewith, rather than by means of peripheral teeth. The other face of the disc may have cam tracks which are scanned by cams and perform the actual switching operation.

In order to avoid any slackness, it is desirable for each projection to have a curved surface which is engaged by a flat on the angled actuating lever so that, when the disc is turned, the flat slides over the curved surface. This construction makes the drive very accurate and yet is cheap to produce.

It is desirable for the projections to have a sliding surface or ramp over which the angled lever can glide until it drops into place behind the curved surface of the projections, the angled lever being for that purpose permitted to reciprocate in a direction substantially normal to the disc. Thus, the end of the angled lever which moves the disc describes an oscillating movement in the plane of the disc and reciprocating movement substantially normal thereto.

With the type of projections described, the disc with its cam tracks and projections can be in the form of a stamping or pressing.

It is advantageous for the angled lever and the latch to be mounted at a spacing from the centre of the control disc and for the end of the latch which engages behind the projections to be shaped exactly like the corresponding end of the angled lever, but movement of the latch being restricted to reciprocation as dictated by the sliding surfaces or ramps.

It is important to the movement of the angled lever for one end of it to bear on the projections of the disc when the latter rotates, and for the other end to bear positively on a rotary cam which rocks the lever.

It is, of course, possible to use a two-armed lever instead of the angled lever, since all that is required is for the projections on the disc to be moved at the end of the angled lever.

In order to avoid play, care must be taken to ensure that the beginning of the sliding surface or ramp on the projections directly adjoins the vertically dropping portion of the curved projections.

Another possibility is to provide two alternately moved angled levers which lie on the sliding surfaces and bear against the curved projections. With such a construction the latch is replaced by a further angled lever.

A simple means of mounting the angled lever is to choose the direction of force of the spring drawing one end of the angled lever towards the cam so that the other end is simultaneously pressed onto the sliding surface of the projections.

If this feature is adopted the sliding of one end of the angled lever over the projections causes it to reciprocate vertically, while the cam produces the rocking movement.

An example of the invention is shown in the accompanying drawings, wherein.

Figure 1:
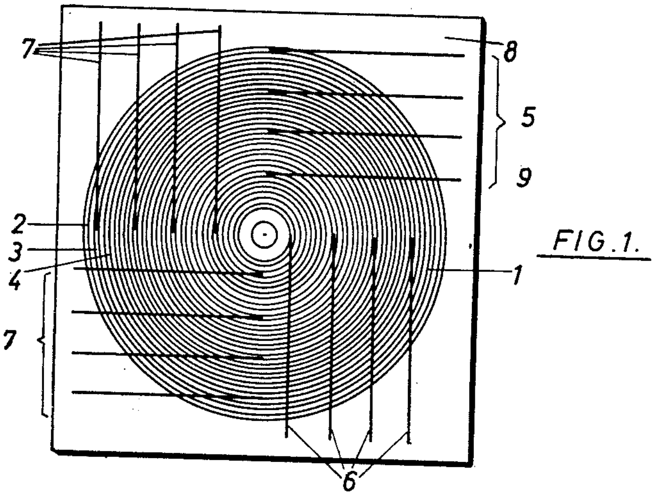
FIG. 1 is a diagrammatic plan of one face of a control disc scanned by contacts.
Figure 2:
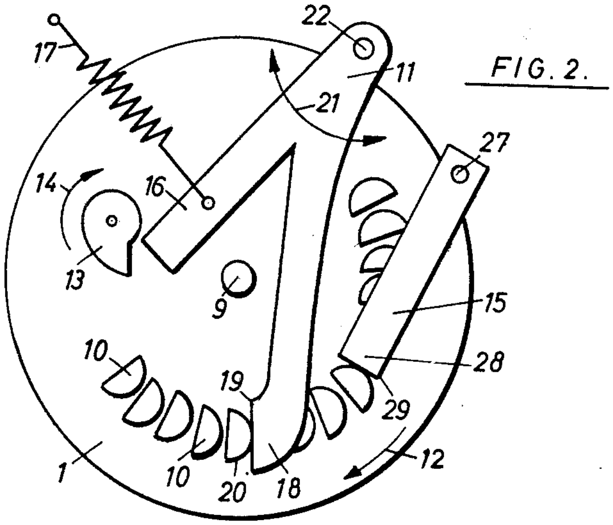
FIG. 2 shows the drive face of the control disc, the projections forming a circle of which only a part is illustrated.
Figures 3, 4:
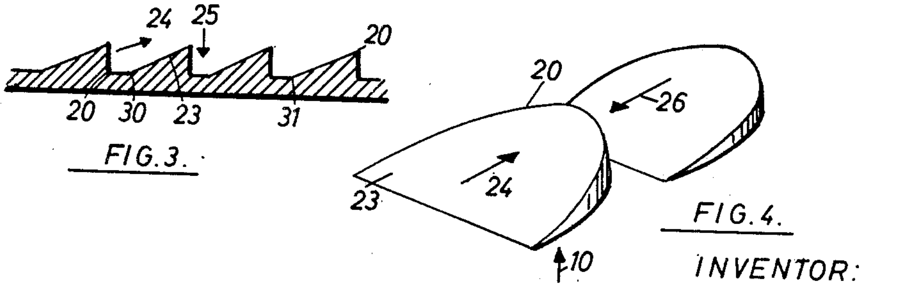
FIG. 3 is a cross-section through the projections.
FIG. 4 is a perspective view of individual projections.

FIG. 1 shows one face of a control disc 1 on which cam tracks 2, 3, 4, etc. are mounted. The cam tracks are scanned by groups of contacts 5, 6, 7. The contacts are fixed to a base 8 and the control disc 1 is rotatable about a spindle 9. On the other face of the disc, saw-tooth-like projections 10 are arranged at an equal distance from the spindle 9. The projections are in circular formation at an equal spacing from one another, similar to the toothing of a gear. The whole control disc may be in the form of a pressing. An angled lever 11 moves the control disc in the direction 12 when the cam 13 turns in the direction 14. A latch 15 prevents the disc 1 from turning opposite to the direction 12. One end 16 is pulled by a spring 17 against the cam 13. The other end 18 has a level surface or flat 19 which bears on the curved surface 20 of the projections 10. The rocking movement of the angled lever 11 in the direction 21 is permitted by the bearing 22 at the vertex of the lever. The force of the spring 17 is directed, and the bearing 22 permits reciprocation vertically to the plane of the paper giving a rocking movement in the direction 21, so that during the rocking movement the end 18 of the angled lever slides along the sliding surface 23 of the projections 10 in the direction 24 until it reaches the curved surface 20 of the projection 10. Here, the end 18 falls under the curved surface 20 in the direction 25. When the angled lever and its end 18 having the level surface 19 move in the direction 26, the control disc is moved in the direction 12. The bearing 27 of the latch 15 only permits vertical reciprocation of its end 28 having the level surface 29. The latch and the angled lever are synchronized so that the control disc is always supported for movement only in the direction 12. The direction of force of the spring 17 is chosen so that the end 18 is always pressed onto the sliding surface 23. The beginning 30 of the ramp 24 is immediately behind the curved surface 20 or is a distance 31 away from it, so that the whole of the level surface 19 can drop behind a projection.

The arrangement described enables the control disc 1 to be rotated very accurately in a simple manner, without any play and at a very low production cost.

I claim:

1. A device for operating the program of a fully automatic washing machine comprising, a rotary control disc, one face of said disc having spaced concentric cam tracks, electric contacts scanning said tracks, the other face of said disc having integral concentrically arranged ratchet tooth-like projections, means rotating said disc in step-by-step movement, said means comprising an oscillating lever pivoted at one end and the other end having driving engagement with said tooth-like projections, and means oscillating said lever wherein said other end of said lever engages behind one of said tooth-like projections during each oscillation and rotates said disc step-by-step in one direction, and latch means preventing rotation of the disc in the other direction.

2. A device according to claim 1, wherein said lever extends substantially diagonally across the said other face of said disc and in parallel spaced relation thereto.

3. A device according to claim 1, wherein the oscillating lever is spring biased into contact with a cam and wherein the lever is moved into driving engagement with said tooth-like projection by said spring.

4. A device according to claim 1, wherein each tooth-like projection has a curved lever engaging face and an adjoining ramp, and wherein said curved face is substantially normal to the general plane of the disc.

5. A device according to claim 3, wherein the lever is angled and so mounted that one end engages the said projections and the other end engages said cam.

References Cited by the Examiner

UNITED STATES PATENTS

| | | | |
|---|---|---|---|
| 2,208,831 | 7/40 | Basseth | 74—125 |
| 2,913,913 | 11/59 | Weber | 74—125 |
| 3,032,617 | 5/62 | Holzer | 200—38 |
| 3,064,098 | 11/62 | Nicolaus | 200—105 |
| 3,104,292 | 9/63 | Holzer | 200—46 |
| 3,112,378 | 11/63 | Holzer | 200—33 |
| 3,115,785 | 12/63 | Simmons | 74—125 |

BROUGHTON G. DURHAM, *Primary Examiner.*